United States Patent [19]

Schott, Jr.

[11] Patent Number: 5,109,252
[45] Date of Patent: Apr. 28, 1992

[54] REMOVABLE MEDIA JOB SETUP FOR DOCUMENT COPIER

[75] Inventor: William C. Schott, Jr., Rochester, N.Y.

[73] Assignee: Eastman Kodak Company, Rochester, N.Y.

[21] Appl. No.: 571,383

[22] Filed: Aug. 23, 1990

[51] Int. Cl.⁵ .............................................. G03G 21/00
[52] U.S. Cl. ..................... 355/202; 355/203; 355/204; 355/209; 355/308
[58] Field of Search ............... 355/202, 218, 204, 207, 355/208, 308, 209, 203

[56] References Cited

U.S. PATENT DOCUMENTS

| | | | |
|---|---|---|---|
| 4,305,652 | 12/1981 | Dattilo et al. | 355/202 |
| 4,451,137 | 5/1984 | Farley | 355/318 X |
| 4,609,283 | 9/1986 | Murata et al. | 355/208 |
| 4,699,501 | 10/1987 | Watanabe et al. | 355/204 X |
| 4,719,516 | 1/1988 | Nagashima | 358/448 |
| 4,760,463 | 7/1988 | Nonoyama et al. | 358/452 |
| 4,763,161 | 8/1988 | Forest et al. | 355/207 |
| 4,803,516 | 2/1988 | Watanabe et al. | 355/326 X |
| 4,806,978 | 2/1989 | Nakatani et al. | 355/202 |
| 4,887,129 | 12/1989 | Shenoy et al. | 355/218 |
| 4,994,853 | 2/1991 | Fukuchi et al. | 355/208 |

Primary Examiner—Fred L. Braun
Assistant Examiner—J. E. Barlow, Jr.
Attorney, Agent, or Firm—Milton S. Sales

[57] ABSTRACT

An apparatus for producing a copy of a multi-page original document in a manner according to operator-selectable setup instructions for designated special pages, which are detected upon advancement of a special page to the exposure station by a document feeder. A data input station receives operator-selectable setup instructions for producing copies of detected special pages and for generating a signal indicative of the received setup instructions. Removable memory media stores the signals. An operator-viewable display provides a preview of the stored setup instructions for verification before a copy is produced. The stored setup instructions can be changed after the preview and before a copy is produced or producing a proof copy according to the stored setup instructions, includes means for operator-selectively changing the setup instructions after the proof copy is made and before a copy is produced. The stored setup instructions will be updated according to the changed setup instructions upon production of a copy but not upon production of a proof copy.

10 Claims, 9 Drawing Sheets

FIGURE 3

| SELECT AN OPTION OR REMOVE MEMORY CARD TO QUIT |||
|---|---|---|
| MEMORY USED 0%  ▬▬▬▬  100% |||
| SAVE A NEW SETUP TO CARD | ERASE MODE | LOAD SETUP FORM CARD |

FIGURE 4

| VERIFY JOB SETUP SELECTIONS ON CONTROL PANEL AND IN FEATURES MENU  THESE SELECTIONS WILL BE USED FOR THE ENTIRE JOB |||
|---|---|---|
| JOB SETUP VERIFIED |  | RETURN PREV |

FIGURE 5

| IF NO SPECIAL PAGES IN THIS JOB PRESS <NO SPECIAL PAGES> OR PLACE ORIGINALS AND KEYSHEETS IN FEEDER OR PRESS <USE PLATEN GLASS> |||
|---|---|---|
| NO SPECIAL PAGES | USE PLATEN GLASS | RETURN PREV |

FIGURE 7

| SELECT SETUP TO BE LOADED, THEN PRESS <LOAD SETUP> SETUP1 ⇐ SELECTED ID SETUP2 ||||
|---|---|---|---|
| SCROLL DOWN | SCROLL UP | LOAD SETUP | RETURN TO PREVIOUS MENU |

FIGURE 8

| SETUP2 LOADED 7 SPECIAL PAGE(S) VERIFY SETUP AND PRESS <SETUP OKAY> OR TO MODIFY A SPECIAL PAGE PRESS <MODIFY SPECIAL PAGE> ||||
|---|---|---|---|
| SETUP OKAY |  | MODIFY SPECIAL PAGE | RETURN PREV |

FIGURE 9

| PLACE ORIGINALS AND KEYSHEETS IN FEEDER OR PRESS <USE PLATEN GLASS> TO COPY FROM THE PLATEN GLASS | | |
|---|---|---|
| USE PLATEN GLASS | | RETURN PREV |

FIGURE 10

| FOR SPECIAL PAGE PRESS <SPECIAL PAGE> PLACE ORIGINAL ON PLATEN, PRESS <START> SCAN ALL SHEETS THEN PRESS <ALL ORIGINALS SCANNED> | | |
|---|---|---|
| SPECIAL PAGE | ALL ORIGINALS SCANNED | RETURN PREV |

FIGURE 13

| SETUP FOR SPECIAL PAGE 12 LOADED<br>MODIFY SETUP IN FEATURE MENU<br>OR<br>FOR EDITING, PLACE ORIGINAL ON PLATEN<br>AND TOUCH BEGIN PAGE WITH POINTER ||||
|---|---|---|
| PAGE SETUP MODIFIED | ERASE SETUP FOR THIS PAGE | RETURN PREV |

FIGURE 14

| SELECT SETUP TO BE ERASED, THEN<br>PRESS <ERASE SETUP><br><br>SETUP1　　SELECTED SETUP<br>SETUP2 |||||
|---|---|---|---|---|
| SCROLL DOWN | SCROLL UP | ERASE SETUP | ERASE CARD | RETURN PREV |

REMOVABLE MEDIA JOB SETUP FOR DOCUMENT COPIER

BACKGROUND OF THE INVENTION

1. Technical Field

This invention relates generally to document copiers, and more particularly to copiers having removable media upon which a selected machine configuration (job setup instructions) can be stored for subsequent production runs.

2. Background Art

U.S. Pat. Nos. 4,806,978 and 4,887,129 relate to copiers having image editing capability, wherein the edited-image data is stored on a removable memory media. The media is programmed on a data input station remote from the marking engine, so as to not interfere with copier operation during the editing process, and is brought to the marking engine with the job.

U.S. Pat. No. 4,719,516 shows an image processing apparatus in which information concerning image processing, particularly the program for sequence control, is stored in detachable memory.

U.S. Pat. No. 4,609,283 discloses a copier in which copying functions for specific pages are inputted and stored in correlation with a code indicia. The same indicia is associated with particular documents. When the indicia is sensed, the prestored function is recalled.

DISCLOSURE OF INVENTION

It is an object of the present invention to provide a copier wherein operator-selectable setup instructions for special pages can be stored in removable memory, and wherein the special pages can be designated so that they are detectable when a multi-page original document is advanced through a document feeder. It is another object of the present invention to provide such a copier wherein the special pages can be detected during a mode when setup instructions are saved to memory and when the instructions are read from memory.

According to one feature of the present invention, apparatus for producing a copy of a multi-page original document in a manner according to operator-selectable setup instructions for special pages of the document includes means for designating special pages, a document feeder for advancing pages of the document to an exposure station seriatim, means for detecting special page designations upon advancement of a special page to the exposure station by the document feeder, a data input station for receiving operator-selectable setup instructions for producing copies of detected special pages and for generating a signal indicative of the received setup instructions; memory media for storing the signals, means on the data input station for removably mounting the memory media, and write means for saving the setup instructions to a mounted memory media.

According to another feature of the present invention, a copier comprises means for producing a copy of a multi-page original document in a manner according to operator-selectable setup instructions for special pages of the document, means for designating special pages, a document feeder for advancing pages of the document to an exposure station seriatim, means for detecting special page designations upon advancement of a special page to the exposure station by the document feeder, memory media containing stored setup instructions for detected special pages, means on the data input station for removably mounting the memory media, and read means for generating a signal indicative of the stored setup instructions for detected special pages and for loading the signal from the memory media to the producing means.

According to still another feature of the present invention, a copier having means for producing a copy of a multi-page original document in a manner according to operator-selectable setup instructions for special pages, memory media containing stored setup instructions for special pages, and read means for generating a signal indicative of the stored setup instructions and for loading the signal from the memory media to the copy producing means is provided with an operator-viewable display for providing a preview of the stored setup instructions for verification before a copy is produced. The copier may further include means for changing the stored setup instructions after the preview and before a copy is produced.

According to yet another feature of the present invention, a copier which is adapted to produce a copy of a multi-page original document in a manner according to operator-selectable setup instructions read from memory media includes means for producing a proof copy according to the stored setup instructions, includes means for operator-selectively changing the setup instructions after the proof copy is made and before a copy is produced. The stored setup instructions contained in the memory media may be updated according to the changed setup instructions upon production of a copy but not upon production of a proof copy.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIGS. 3-5 are views of display screen menus for the "Save Setup to Media" mode;

FIGS. 7-10 are views of display screen menus for the "Load Setup from Media" mode;

FIGS. 11a and 11b are logic flow charts of the "Load Setup from Media," the "Re-edit," and the "Erase" modes;

FIGS. 12 and 13 are views of display screen menus for the "Re-edit" mode; and

FIG. 14 is a view of a display screen menu for the "Erase" mode.

BEST MODE FOR CARRYING OUT THE INVENTION

The present invention is described herein as part of an electrophotographic copier, but it will be understood that the invention can be used in any form of color copier. The description will be directed in particular to elements forming part of, or cooperating more directly with, apparatus in accordance with the present invention. It is to be understood that elements not specifically shown or described may take various forms well known to those skilled in the art.

Figure 1:
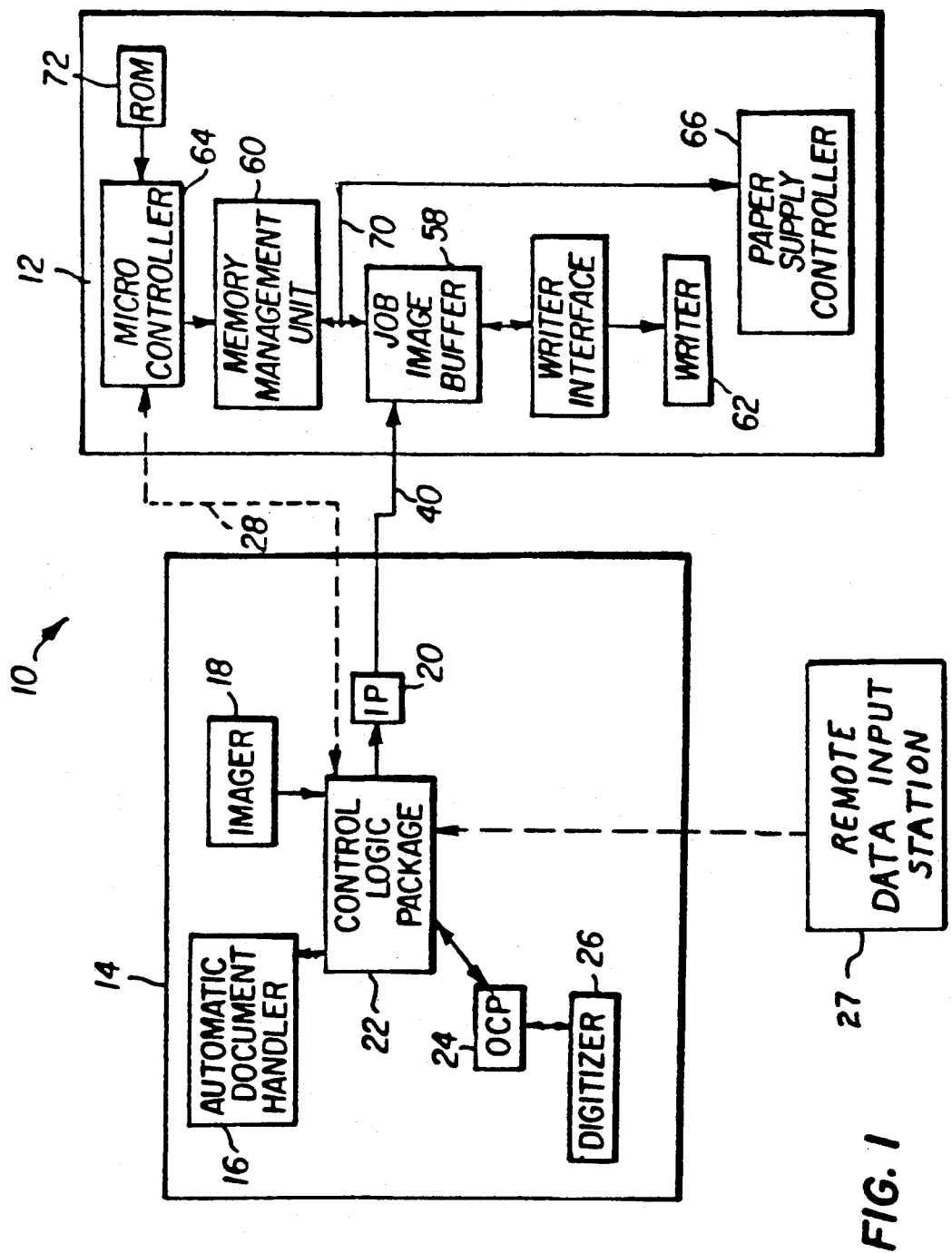
FIG. 1 is a schematic block diagram of a copier according to one embodiment of the present invention.

According to FIG. 1, a copier 10 includes a marking engine 12 and a document scanner 14. Scanner 14 consists of an automatic document handler 16 for stream feeding multiple original document sheets past an optical system. Focused light reflected from an original document sheet image is swept past an imager 18 such as a linear array of phototransducers, (photodiodes or charge coupled devices) for converting the image of an original document into electrical signals having values representative of the image density at associated pixel areas on the original document.

As the scanning of the original document sheet proceeds in a direction perpendicular to the row of pixel areas, a series of output signals from the transducers are repetitively loaded into an associated shift register (not shown) and shifted out serially to provide a series of electrical signals having values representative of the image density of respective pixel areas in corresponding rows of pixel areas across the document image.

The image data may be manipulated by image processing electronics 20. Representative image processing functions include linearity correction, unsharp masking, image editing, windowing, document recognition, magnification, accent (spot) color, highlighting, and color substitution.

Scanner 14 also includes a control logic package 22 having an integral data input station, consisting of an operator control panel 24 and a digitizer 26, for the operator to input functions and to receive messages from the copier. Alternatively, setup instructions may be received via removable memory media from a remote data input station 27.

The logic package consists of control software, interface software, and logic hardware. Setup instructions are input to the scanner, while synchronization signals to identify separate scan lines and to provide page information and marking engine control, as well as information for finishing and processing of jobs, will be sent to marking engine 12 via a job control communications link 28.

Functions inputted by the operator at either the integral or the remote data input station may include job level features, page level features, and area level features. Job level features may include such items as the number of copy sets requested, color, exposure, magnification, paper supply, simplex or duplex originals and/or copies, collation, finishing, covers, zoom, transparency interleaving, etc. Page level features may include contrast, brightness, screening for breaking a continuous tone original into dots for reproduction as half-tone images, positive-to-negative image reversal, auto-magnification, x- and y-scaling, stacking, pamphlet, book copy, book erase (binding edge), image combine, edge erase, separators, image shift, etc. Area level features may include selected area erase (blanking and framing), contrast, brightness, image shift, magnification, image reversal, accent color, screening, highlighting, color substitution, etc. Of course many of the features listed for one level may be implemented at a different level.

An interesting advantage of using a remote data input station is that it permits a operator to set up a job in a language different than the default language of the copier. For example, an operator may use a, say, Spanish language work station to set up a job. When the removable memory media is loaded into a, say, English language default copier, the copier will switch languages from English to Spanish. When the media is removed, the copier will return to its English default language.

Figure 2:
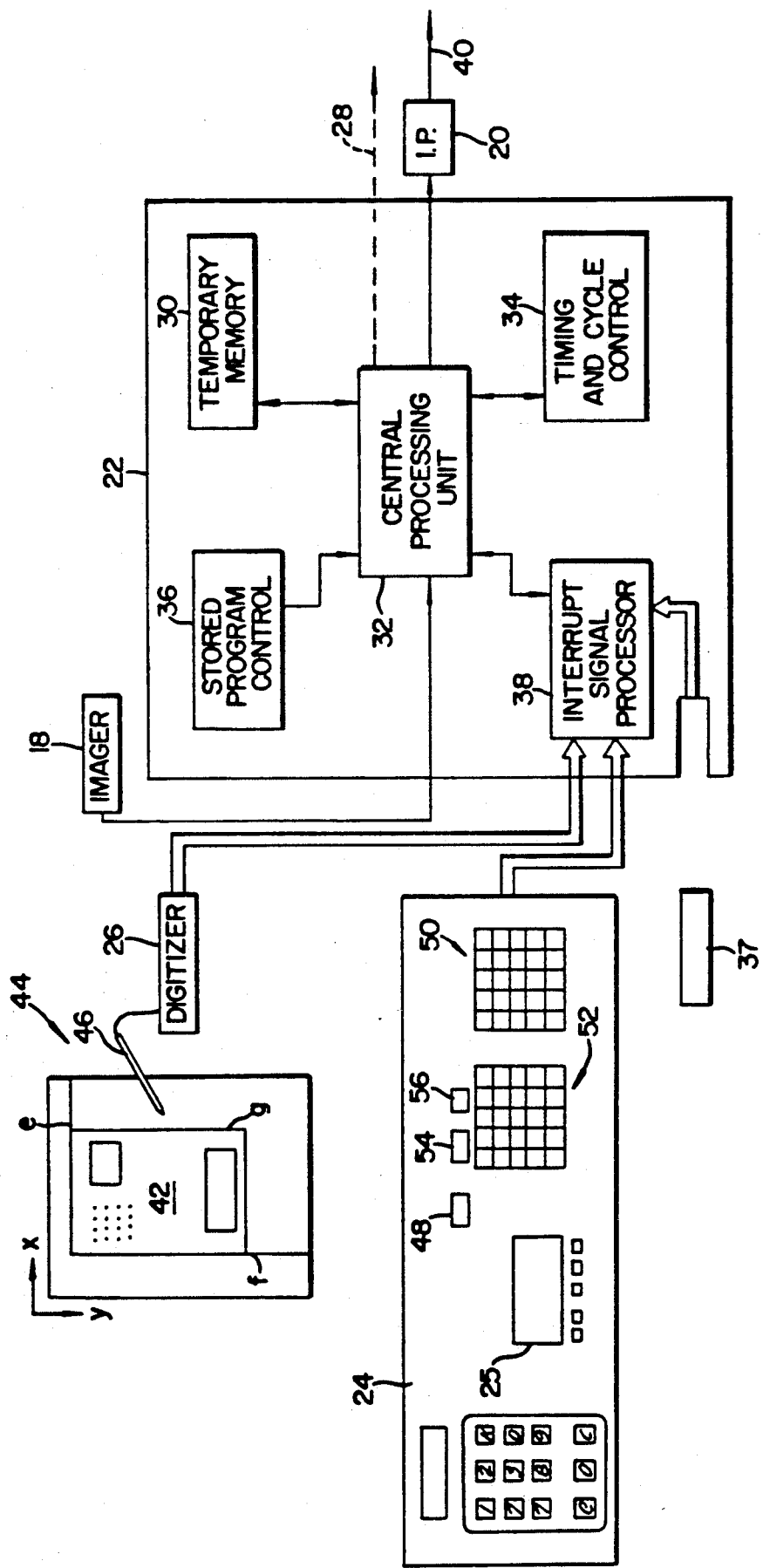
FIG. 2 is a schematic view illustrating a data input station and block diagrams of controls for controlling the copier of FIG. 1.

FIG. 2 is a more detailed block diagram of control logic package 22, operator control panel 24 with softkey-provided LCD display screen 25, and digitizer 26. Display screen 25 provides text, graphics, and softkey selections. Messages and graphics are used to guide the operator through the various modes of operation explained below.

The control logic package consists of temporary data storage memory 30, central processing unit 32, timing and cycle control unit 34, and stored program control 36. Data input and output is performed sequentially under program control. Input data are received from image imager 18. Setup and control signals are received either from operator control panel 24 and digitizer 26 or from a removable memory media 37 through an interrupt signal processor 38 derived from various switches, sensors, and analog-to-digital converters. The output data is applied through processing electronics 20 and an image data bus 40, and control signals are applied via control communication link 28, to marking engine 12.

Integral digitizer 26 may take any of several well known forms such as the digitizing tablet disclosed in U.S. Pat. No. 4,791,450, wherein an original 42 is placed face up on a tablet 44. A wand 46 associated with the tablet is used by the operator to designate various positions on the original. Transducers located beneath the original produce signals relating the position of the positions touched relative to an edge of the tablet. Alternatively, the tablet may be of the known sonic type wherein a spark formed by a wand creates sound waves in the air which are sensed by microphones placed along the sides of the tablet or wherein a sensor is placed in the wand and sources at known points on the sides of the tablet emit sonic signals. Remote data input station 27 is provided with a similar digitizer, not shown.

In order to identify particular regions of original document sheet 42, the document sheet is placed face up on digitizing tablet 44 and registered against an appropriate corner (or centered relative to a predetermined edge). Wand 46 is used by the operator to designate the format of the original and the locations of the various parts of the image information. The operator calls up special programs for accomplishing various area level tasks via operator control panel inputs.

For example, the operator may input a desired accent color for the information appearing in a designated area by depressing an accent input button 48 and the one of the twenty-five color buttons 50 corresponding to a selected color from a palette 52 of available colors. The operator may then move wand 46 to two or more points to define an imaginary rectangle or other area which encloses the information in the designated area and encloses no other information.

The operator may then proceed to input a desired highlight color for the information appearing in yet another area by depressing a highlight input button 54 and the one of the twenty-five color buttons 50 corresponding to a selected color (yellow) from palette 52 of available colors. The operator then uses wand 46 to identify that area.

Next, the operator may proceed to input a desired substitution color for the information appearing in still another area by depressing a color substitution button 56 and touching a pixel on the original document which is of the color to be substituted for. Finally, the operator depresses the one of the twenty-five color buttons 50 corresponding to a selected substitution color from palette 52 of available colors, and uses wand 46 to identify the third area.

Inputs from the digitizer and the color select buttons are inputted into control logic package 22 through interrupt signal processor 38 and are stored in temporary memory 30.

The operator next takes the original document 42 and places it on the exposure platen (using document handler 16, for example) so that the side to be reproduced faces the exposure lamps and registers the sheet with the appropriate corner (or centers it against a registration edge). The stored program control on the control logic package has a program for compensation for the reversal of the sheet vis-a-vis the location of areas when the sheet is face-up versus the location of these areas when the sheet is turned over for exposure. Alternatively, format input may not be needed where the same point on the sheet is registered when the sheet is both face up and face down. For example, where the sheet is registered when face-up using centering of its left edge for digitizing and then inverted for exposure so that the same edge is again centered, the location of the digitized areas is known without need of format input.

Referring again to FIG. 1, marking engine 12 receives bit stream image data over bus 40 and job control data over a communications link 28, both for storage in a multiple page buffer memory 58. The page buffer will accept electronic image data from scanner 14 and store that data until needed by a writer 62. The storage media is preferably a dynamic random access memory under the control of a memory management unit 60.

Control means, including a micro controller 64 is arranged to perform arithmetic and logic operations and instruction decoding as well as controlling the time allocation of peripherals (such as a paper supply controller 66 and accessories communications for finishers, staplers, exit hoppers, etc.) through a machine control communications link 70. Several output functions may be available for receiver sheets, including selection of output trays, stapling, sorting, folding, finishing, mailbox, envelope receiver, etc.

Micro controller 64 has associated with it RAM for storing image location addresses and a read only memory 72 in which is stored various fixed forms such as test patterns, density patch patterns for process control purposes, billing forms, etc.

Removable memory media 37 shown in FIG. 2 is preferably a battery backed RAM card insertable in a suitable slot in the integral and remote data input stations. The amount of memory used by a job setup will vary depending on the number of pages in the document and the complexity of each special page. A special page is a page which includes page level and/or area level feature functions inputted by the operator at one of the data input stations during setup procedure. Documents that have no special pages will require minimal amounts of memory, while documents that have many special pages with multiple areas per page will require substantial amounts of memory. Because documents vary in complexity, there is no exact number that reflects the amount of memory a document will require.

Data Format Example

The removable memory media allows the operator to either manually or automatically save job setup data to the media and to load the stored data from the media at copy run time. All three levels of setup information (i.e., document level, page level, and area level) are saved in a format which allows the operator to select specific job setups for verification of control panel settings, to modify specific pages of the document, and to load page information at run time. Each level feature is saved in a particular field so that each field can be read in sequence as it is needed.

The following is provided as a specific example of a suitable data format for a particular application. It is not intended to imply that other formats would not be better suited for this or other applications within the scope of the present invention.

Removable memory media 37 has a job identification field, as well as a page field, area field, coordinate field, checksum, and end of file marker.

Each job setup that is saved on removable memory media 37 is provided with a job identification string to be used to identify the job on the media. Operators have the choice of either using a preset job identification (for example, "SETUP1," "SETUP2," etc.) or of entering a personalized job identification using wand 46. Job setups stored on removable memory media 37 begin with a job header delimiter, such as for example [!!], followed by a, say, ten ASCII character identification string, using a "@" to pad any unused character spaces. A header example might be:

!!SETUP1@@@@

!!JOB1*02-90

Stored pages begin with a page delimiter [!!!] followed by a page number, of which page zero is reserved for job level features, for page level feature default selections, and for page level feature selections applicable to each and every page of the job. Page #1 through page #n will contain page level and/or area level feature selections pertaining to specific pages within a job. If the job contains special pages, each special page will be saved and numbered in sequential order. A page data example might be:

!!!00 [job level feature data]

!!!01 [special page #1 data]

After the last page of data is saved, a two byte checksum is calculated and stored in two byte locations preceding an end-of-file marker. An end-of-data marker, such as [!!!!] designates the last location of valid data on the removable memory media.

Save Setup to Media Mode

When an operator inserts a removable memory media 37 into a data input station (integral or remote), the main menu shown in FIG. 3 will appear on the associated LCD display screen. This menu graphically shows the amount of memory used on the media and gives the operator softkey selections from which to choose the mode of operation.

In response to selection of the "SAVE A NEW SETUP TO CARD" softkey, the operator enters a job identification, and the menu of FIG. 4 will appear; prompting the operator to verify job level selections for the entire job. Before verification, the operator can change any settings on the control panel. The page level features selected at this point will be used as the page feature defaults.

When the job level features have been verified, the menu of FIG. 5 appears. Now, the operator may save page level and/or area level setup data to the removable memory media either by manually placing each original document sheet on the scanner platen or by means of automatic document handler 16. The manual method is initiated by pressing the "USE PLATEN GLASS" softkey, and the operator places each original document sheet onto the platen for scanning. If a page requires special features, they are entered at the data input station and transferred to the removable memory media with the appropriate job and page delimiters. After each special page is scanned and saved, the page level and/or area level features are reset back to default. Only those pages that use special features will be stored on the removable memory media. Therefore, page numbers on the media correspond only to those pages that use special features, and have no correlation to the actual document page numbers. When using remote data input station 27, all operations are the same except the pages are not scanned.

In the automatic document handler method a multi-sheet original document is placed in automatic document handler 16. Sheets requiring special features are identified by designating means such as a special mark on the sheet or by means of a special "keysheet" inserted in the document in front of the sheet to be identified. As the sheets are being fed to the platen for scanning, the designating means is detected, and the feeder will transport the keysheet (if any) and the special feature original sheet to the exit hopper without scanning. The operator removes the special feature original sheet from the hopper, selects the appropriate features for the page, manually places the sheet on the platen for scanning, and replaces the sheet into the exit hopper. Duplex originals will be scanned on both sides before being returned to the exit hopper and restarting the feeder.

Figure 6:
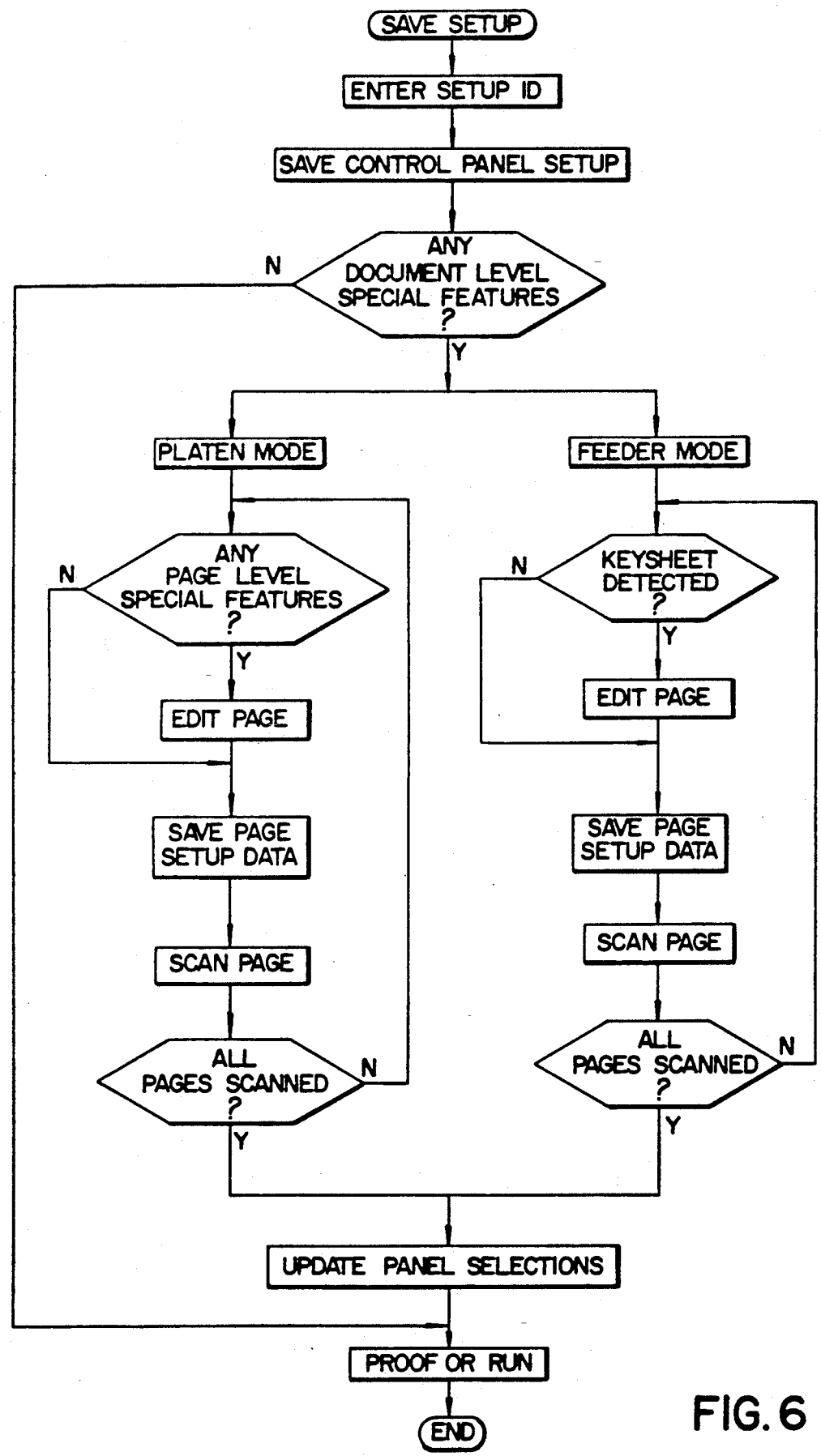
FIG. 6 is a logic flow chart of the "Save Setup to Media" mode.

The "Save Setup to Media" mode is summarized in the logic flow chart of FIG. 6.

Load Setup From Media Mode

To run a job that has previously been stored on removable memory media 37, the original document and removable memory media are brought to copier 10. The operator inserts the removable memory media into the copier, and selects a "LOAD SETUP FROM CARD" mode from the main menu of FIG. 3. A menu such as shown in FIG. 7 will replace the main menu on LCD display screen 25. The identifications of the first and second jobs on the removable memory media will be displayed, and the operator may scroll through all the job identifications on the media until the proper job is identified. At that time, the operator control panel will automatically be configured according to the setup instructions associated with the selected job level data. When the proper job has been selected, the softkey corresponding to an "LOAD SETUP" instruction can be pressed to display the menu of FIG. 8. A message will tell the operator the identification of the loaded job and the number of special pages in the job. The operator will be prompted to verify the job control panel setup and features menu for proper selections, and instructed how to modify a special page as discussed below in the section of this specification entitled "RE-EDIT MODE."

When the "SETUP OKAY" softkey button is pressed, a menu (FIG. 9) will appear on the LCD display screen. The operator may place the document, with keysheets inserted, into the automatic document feeder, or press "USE PLATEN GLASS" button to manually run the job. If the feeder is used, each original document sheet page will be scanned and copied. When a keysheet is detected, the page features for that particular page will be read from the remote memory media.

Once all of the pages have been scanned using the feeder, the marking engine will continue printing the number of requested copies, or, if a proof copy was requested, the operator may verify the output before printing the required sets.

When the operator presses the "USE PLATEN GLASS" softkey, the menu of FIG. 10 is displayed. A message will explain that before pressing start to scan special pages, the user must press "SPECIAL PAGE" so that the page features for that particular page will be read from the removable memory media. Once all pages of the document have been scanned, the operator will press the "ALL ORIGINALS SCANNED" softkey, and the marking engine will start printing. That is, in the manual mode, printing does not start until all of the pages have been scanned. This prevents the marking engine from repeatedly cycling ON and OFF.

Figure 11A:
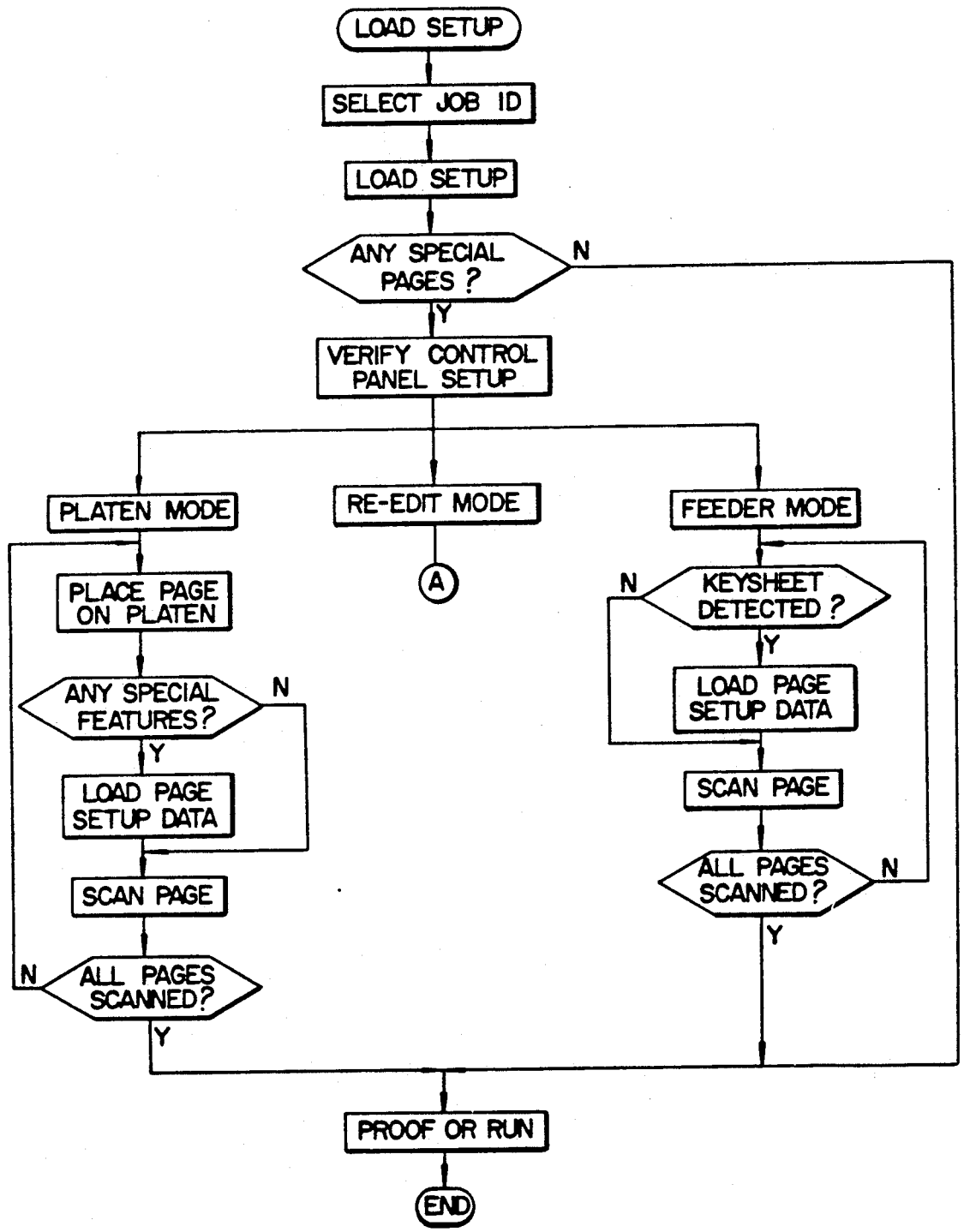
Figures 11B, 12:
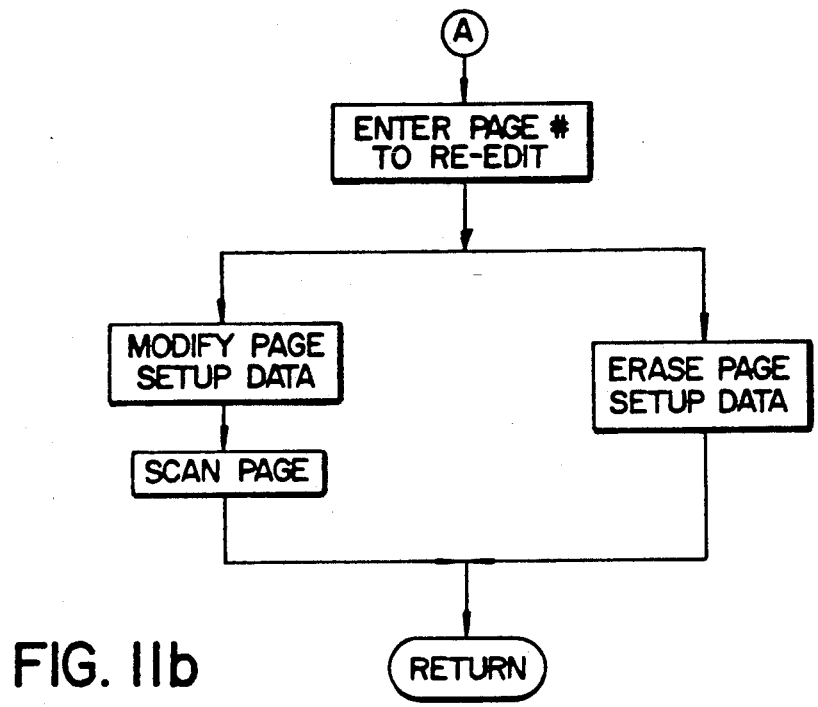

The "Load Setup from Media" mode is summarized in the logic flow charts of FIGS. 11a and 11b.

Re-edit Mode

As mentioned above, when the operator is in the "Load Setup" mode, any special pages may be modified by pressing the "MODIFY SPECIAL PAGE" softkey. The menu of FIG. 12 will appear, and digitizer wand 46 can be used to select the number of the special page. The operator can backspace characters or cancel the displayed special page number and re-enter again.

The menu of FIG. 13 will appear after the "ENTER PAGE #" softkey is pressed. A message will tell the operator that the specific page requested for modification is loaded. If the page contains area features, the operator may modify any existing areas. Once the operator has modified the page, the "PAGE SETUP MODIFIED" softkey will be pressed. The operator is also given the opportunity to erase the special page from the remote memory media by pressing the "ERASE SETUP FOR THIS PAGE" softkey.

An operator may select an "ERASE" mode softkey from the main menu of FIG. 3. A menu such as shown in FIG. 14 will replace the main menu on the LCD display screen. The identifications of the first and second jobs on the removable memory media will be displayed, and the operator may scroll through all the jobs on the media. When the proper job has been selected, the softkey corresponding to an "ERASE SETUP" instruction can be pressed to erase the job setup of the identified job.

If the operator wishes to erase all the job setups on the removable memory media, the softkey corresponding to an "ERASE CARD" instruction can be pressed. User confirmation before erasure can be provided for.

The invention has been described in detail with particular reference to preferred embodiments thereof, but it will be understood that variations and modifications can be effected within the spirit and scope of the invention.

What is claimed is:

1. Apparatus for producing a copy of a multi-page original document in a manner according to operator-selectable setup instructions for special pages of the document, said apparatus comprising:
   means for designating special pages;
   a document feeder for advancing pages of the document seriatim;
   means for detecting special page designations upon advancement of a special page by the document feeder;
   a data input station, operable in response to the detection of a special page designation by said detecting means, for receiving operator-selectable setup instructions to be used for producing copies of detected special pages and for generating a signal indicative of the received setup instructions;
   memory media for storing said signals;
   means on said data input station for removably mounting said memory media; and
   write means for saving the setup instructions to mounted memory media.

2. Apparatus as set forth in claim 1 wherein said means for designating special pages comprises keysheets insertable into the multi-page original document in association with the special pages to be designated.

3. Apparatus as set forth in claim 1 wherein said means for detecting special page designations comprises means for sensing a special mark on special pages.

4. A copier comprising:
   means for producing a copy of a multi-page original document in a manner according to operator-selectable setup instructions for special pages of the document;
   means for designating special pages;
   a document feeder for advancing pages of the document to an exposure station seriatim;
   means for detecting special page designations upon advancement of a special page to the exposure station by the document feeder;
   memory media containing stored setup instructions for detected special pages;
   means on said copy producing means for removably mounting said memory media; and
   read means, operable in response to the detection of a special page designation by said detecting means, for generating a signal indicative of the stored setup instructions for detected special pages and for loading the signal from said memory media to said copy producing means.

5. Apparatus as set forth in claim 4 wherein said means for designating special pages comprises keysheets insertable into the multi-page original document in association with the special pages to be designated.

6. Apparatus as set forth in claim 4 wherein said means for detecting special page designations comprises means for sensing a special mark on special pages.

7. A copier comprising:
   means for producing a copy of a multi-page original document in a manner according to operator-selectable setup instructions for special pages of the document;
   means for designating special pages;
   a document feeder for advancing pages of the document to an exposure station seriatim;
   means for detecting special page designations upon advancement of a special page to the exposure station by the document feeder;
   a data input station, operable in response to the detection of a special page designation by said detecting means, for receiving operator-selectable setup instructions to be used for producing copies of detected special pages and for generating a signal indicative of the received setup instructions;
   memory media for storing said signals;
   means on said data input station for removably mounting said memory media; and
   write/read means for (1) saving the setup instructions to said memory media and (2) loading the saved setup instructions for detected special pages from said memory media to said copy producing means.

8. A copier as defined in claim 7 further comprising operator-viewable display means, responsive to said generated signal, for providing a preview of the saved setup instructions for verification before a copy is produced by said copy producing means.

9. A copier as set forth in claim 8 further comprising means for changing the saved setup instructions after the generated signal is previewed and before a copy is produced.

10. A copier as defined in claim 7 further comprising:
    means for producing a proof copy of the special page according to said signal;
    means for operator-selectively changing the setup instructions after the proof copy is made and before a copy is produced; and
    means for updating the saved setup instructions contained in the memory media according to the changed setup instructions upon production of a copy said updating means being non-operative to update the saved setup instructions upon production of a proof copy.

* * * * *